(12) United States Patent
Lefcourt et al.

(10) Patent No.: US 11,499,505 B2
(45) Date of Patent: Nov. 15, 2022

(54) MULTI-PULSE ROCKET MOTOR WITH FLIGHT TERMINATION DESTRUCT CHARGE

(71) Applicant: Raytheon Company, Waltham, MA (US)

(72) Inventors: Adam I. Lefcourt, Tucson, AZ (US); John A. Meschberger, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 1 day.

(21) Appl. No.: 16/896,271

(22) Filed: Jun. 9, 2020

(65) Prior Publication Data

US 2021/0381468 A1 Dec. 9, 2021

(51) Int. Cl.
| | |
|---|---|
| *F02K 9/96* | (2006.01) |
| *B64F 5/60* | (2017.01) |
| *F02K 9/95* | (2006.01) |
| *F02K 9/92* | (2006.01) |
| *F02K 9/28* | (2006.01) |

(52) U.S. Cl.
CPC ............... *F02K 9/96* (2013.01); *B64F 5/60* (2017.01); *F02K 9/28* (2013.01); *F02K 9/92* (2013.01); *F02K 9/95* (2013.01)

(58) Field of Classification Search
CPC ..... F02K 9/24; F02K 9/26; F02K 9/28; F02K 9/566; F02K 9/92; F02K 9/95; F02K 9/96
See application file for complete search history.

(56) References Cited

U.S. PATENT DOCUMENTS

| | | | | |
|---|---|---|---|---|
| 2,988,877 | A | * | 6/1961 | Shope ...................... F02K 9/10 60/255 |
| 3,266,240 | A | * | 8/1966 | Kurylko ................... F02K 9/26 60/256 |
| 4,470,562 | A | | 9/1984 | Hall et al. |
| 4,956,971 | A | | 9/1990 | Smith |
| 5,070,691 | A | | 12/1991 | Smith et al. |
| 5,206,455 | A | | 4/1993 | Williams et al. |
| 5,206,989 | A | | 5/1993 | Smith et al. |
| 5,419,118 | A | | 5/1995 | McSpadden et al. |
| 5,456,425 | A | | 10/1995 | Morris et al. |

(Continued)

*Primary Examiner* — Todd E Manahan
*Assistant Examiner* — Kyle Robert Thomas
(74) *Attorney, Agent, or Firm* — Renner, Otto, Boisselle & Sklar, LLP

(57) ABSTRACT

A flight test system uses a flight termination destruct charge that is configured to overpressurize a pressure vessel in a rocket motor to terminate thrust. The flight termination destruct charge is an electroexplosive detonator arranged on a final burn surface of a propellant contained in the pressure chamber. In a multi-pulse rocket motor, one of the pulses is ignited by the activation of the detonator. The activated detonator is configured to ignite the propellant grain without venting of the gas resulting from the burning of the propellant. Due to the burning of the propellant, the surface area in the pressure vessel is increased which causes increased pressure in the pressure vessel until a critical pressure is reached. When the critical pressure is reached, the rocket motor casing structural capabilities are exceeded. The overpressurized rocket motor casing then ruptures and thrust of the rocket motor is terminated.

20 Claims, 6 Drawing Sheets

(56) References Cited

U.S. PATENT DOCUMENTS

| | | | |
|---|---|---|---|
| 5,491,973 A | 2/1996 | Knapp et al. | |
| 5,507,231 A * | 4/1996 | Moore | B64G 1/002 |
| | | | 102/374 |
| 7,012,233 B2 | 3/2006 | Brown et al. | |
| 7,373,885 B2 * | 5/2008 | Skinner | F42B 39/14 |
| | | | 60/223 |
| 8,104,719 B2 | 1/2012 | Shiau et al. | |
| 8,256,716 B2 | 9/2012 | Dietrich et al. | |
| 8,291,691 B2 | 10/2012 | Spear et al. | |
| 9,261,048 B2 | 2/2016 | Suzuki et al. | |
| 9,329,011 B1 | 5/2016 | Smith | |
| 9,702,320 B2 | 7/2017 | Mihara et al. | |
| 9,784,545 B1 * | 10/2017 | Graham | C06B 45/12 |
| 9,988,889 B2 | 6/2018 | Carlson et al. | |
| 10,006,408 B2 | 6/2018 | Mihara et al. | |
| 10,001,085 B2 | 7/2018 | Isaac et al. | |
| 10,197,611 B2 | 2/2019 | Biggs | |
| 10,247,139 B2 | 4/2019 | Suzuki et al. | |
| 10,634,093 B2 * | 4/2020 | Krishnan | F02K 9/10 |
| 2007/0113537 A1 * | 5/2007 | Chang | F02K 9/08 |
| | | | 60/253 |
| 2007/0240600 A1 * | 10/2007 | Skinner | F42B 39/20 |
| | | | 102/275.5 |

* cited by examiner

MULTI-PULSE ROCKET MOTOR WITH FLIGHT TERMINATION DESTRUCT CHARGE

The invention relates to thrust termination systems for flight vehicles, and more particularly to termination of flight in new flight test systems utilizing rocket motors.

DESCRIPTION OF THE RELATED ART

Various applications use launchable payloads that are launched from a suitable platform, such as a land, sea, air, or space vehicle. The payload to be launched is dependent on the application. Military applications that use land vehicles, aircrafts, surface ships, or underwater vehicles may use deployable munitions as payloads. The payloads may be carried by a flight vehicle such as a missile having a rocket motor. Flight vehicles including rocket motors undergo testing to ensure successful operation. For example, flight testing may be performed on a military test range. During a flight test, the flight test vehicle must terminate thrust on demand to meet range safety requirements that are determined by the type of flight vehicle and the test range.

Given the envelope constraints of existing flight vehicles, incorporating flight termination system electronics and energetics into the existing vehicle envelope may be difficult. Prior attempts to incorporate flight termination components into new missiles with existing form factors have been shown to be deficient in that the components may not be accommodated within the existing envelope. Additional external devices may be added to the flight vehicle for accommodating the flight termination components, but this solution is disadvantageous in that an undesirable length and volume is added to the rocket which may negatively impact testing operation.

SUMMARY OF THE INVENTION

In a general embodiment, a flight test system according to the present application uses a flight termination destruct charge that is configured to rupture the pressure vessel for terminating thrust of the rocket motor. The flight termination destruct charge is formed as an electroexplosive detonator that is explosively coupled to the propellant contained in the pressure vessel. The activated detonator is configured to ignite the propellant grain without venting the pressure vessel. By placing the detonator on the forward face of the propellant (also referred to as the final burn surface), when functioned it ignites the propellant with no vent path, resulting in a rupturing of the propellant grain. When a critical pressure of the pressure vessel is reached, the rocket motor casing's structural capabilities are exceeded. The overpressurized case then ruptures thereby terminating thrust of the rocket motor.

The detonator may be implemented in a single-pulse or a multi-pulse rocket motor. In the dual-pulse or multi-pulse rocket motor, the detonator is arranged on an insulated surface of the propellant contained in a second pulse chamber of the pressure vessel that contains a second propellant that is burned during a final pulse of the flight vehicle. Implementing the detonator in the multi-pulse rocket motor is advantageous in that the additional pulse may be used to activate the detonator such that the additional pulse is effectively used as the thrust termination charge for the rocket motor.

Using the detonator in either the single-pulse or dual-pulse rocket motor is advantageous in that the detonator is integrated into an existing envelope of a flight vehicle and larger flight termination energetic trains may be eliminated. The detonator enables range safety requirements to be met while also eliminating additional system qualifications that are required for implementing prior flight test systems. The detonator may be inserted into an existing port of the casing that is plugged prior to testing.

According to an aspect of the invention, a flight test system is configured for integration into an existing envelope of a flight vehicle.

According to an aspect of the invention, a flight test system is configured for integration into a rocket motor module of a flight vehicle.

According to an aspect of the invention, a flight test system includes flight termination system electronics and an electroexplosive detonator coupled to a propellant.

According to an aspect of the invention, a flight test system includes an electroexplosive detonator arranged on a final burn surface of a propellant.

According to an aspect of the invention, a flight test system is configured to overpressurize a pressure vessel in a rocket motor module.

According to an aspect of the invention, a flight test system is configured for integration into a multi-pulse rocket motor of a flight vehicle.

According to an aspect of the invention, a method of flight testing a flight vehicle includes using a pulse in a multi-pulse rocket motor to terminate thrust of the rocket motor.

According to an aspect of the invention, a flight test system for a rocket motor includes flight termination system electronics arranged in a casing of the rocket motor, and an electroexplosive detonator coupled to a propellant inside a pressure vessel defined by the casing, the electroexplosive detonator being configured for activation by the flight termination system electronics to ignite the propellant whereby the pressure vessel is overpressurized to rupture the casing.

According to an embodiment of any paragraph(s) of this summary, the electroexplosive detonator is arranged on a final burn surface of the propellant.

According to an embodiment of any paragraph(s) of this summary, the electroexplosive detonator is arranged on a forward-facing surface of the propellant.

According to an embodiment of any paragraph(s) of this summary, the casing has a forward-facing dome portion and the electroexplosive detonator is mounted to the dome portion.

According to an embodiment of any paragraph(s) of this summary, the dome portion defines a pluggable port for receiving the electroexplosive detonator.

According to an embodiment of any paragraph(s) of this summary, the electroexplosive detonator is configured to ignite the propellant without a vent path.

According to an embodiment of any paragraph(s) of this summary, the propellant comprises a solid propellant grain.

According to another aspect of the invention, a flight test system includes a multi-pulse rocket motor module including a first pulse chamber containing a first burnable propellant that is burned during a first stage of the multi-pulse rocket motor and a second pulse chamber containing a second burnable propellant that is burned during a second stage of the multi-pulse rocket, flight termination system electronics arranged in the multi-pulse rocket motor module, and an electroexplosive detonator coupled to the second burnable propellant inside the second pulse chamber, the electroexplosive detonator being activated by the flight termination system electronics to ignite the second burnable propellant whereby the pressure vessel is overpressurized.

According to an embodiment of any paragraph(s) of this summary, the electroexplosive detonator is arranged on a final burn surface of the second burnable propellant.

According to an embodiment of any paragraph(s) of this summary, the electroexplosive detonator is arranged on a forward surface of the second burnable propellant.

According to an embodiment of any paragraph(s) of this summary, the electroexplosive detonator is mounted to the dome portion.

According to an embodiment of any paragraph(s) of this summary, the second pulse chamber defines a pluggable port for receiving the electroexplosive detonator.

According to an embodiment of any paragraph(s) of this summary, the electroexplosive detonator is configured to ignite the second burnable propellant without a vent path.

According to an embodiment of any paragraph(s) of this summary, the first burnable propellant and the second burnable propellant comprise a solid propellant grain.

According to still another aspect of the invention, a method of flight testing a multi-pulse rocket motor includes using an additional pulse that occurs after a first pulse in the rocket motor as a thrust termination charge, overpressurizing a pulse chamber containing a burnable propellant during the additional pulse, and rupturing the burnable propellant to fail a casing of the rocket motor and terminate thrust of the rocket motor.

According to an embodiment of any paragraph(s) of this summary, the method includes selecting an electroexplosive detonator from a plurality of detonators based on at least one of a size of the pulse chamber, size of the burnable propellant, burn rate of the burnable propellant, and density of the burnable propellant, inserting the detonator into the pulse chamber, and activating the electroexplosive detonator as the thrust termination charge.

According to an embodiment of any paragraph(s) of this summary, the method includes coupling the electroexplosive detonator to a final burn surface of the burnable propellant, and igniting the burnable propellant without a vent path using the electroexplosive detonator.

According to an embodiment of any paragraph(s) of this summary, the method includes inserting flight termination system electronics in a casing of the rocket motor, and activating the electroexplosive detonator using the flight termination system electronics.

According to an embodiment of any paragraph(s) of this summary, the method includes integrating the electroexplosive detonator into the pulse chamber of a predefined casing of the rocket motor.

According to an embodiment of any paragraph(s) of this summary, the method includes plugging a port formed in the casing of the pulse chamber prior to flight testing, unplugging the port, and inserting the electroexplosive detonator into the port for flight testing.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have application in defense applications, such as in a hypersonic vehicle or in any flight vehicle where space may be constrained. The flight test system described herein may be implemented in any suitable flight vehicle. Single-pulse or multi-pulse rocket motors may be suitable for use with the flight test system. The rocket motor may be part of a missile that is suitable for carrying a payload during normal, non-testing operation of the rocket. For example, the missile may include a payload module for carrying a munition for a military application. The flight test system may be suitable for any other flight vehicles that are subject to range requirements and require on-demand flight termination.

Figure 1:
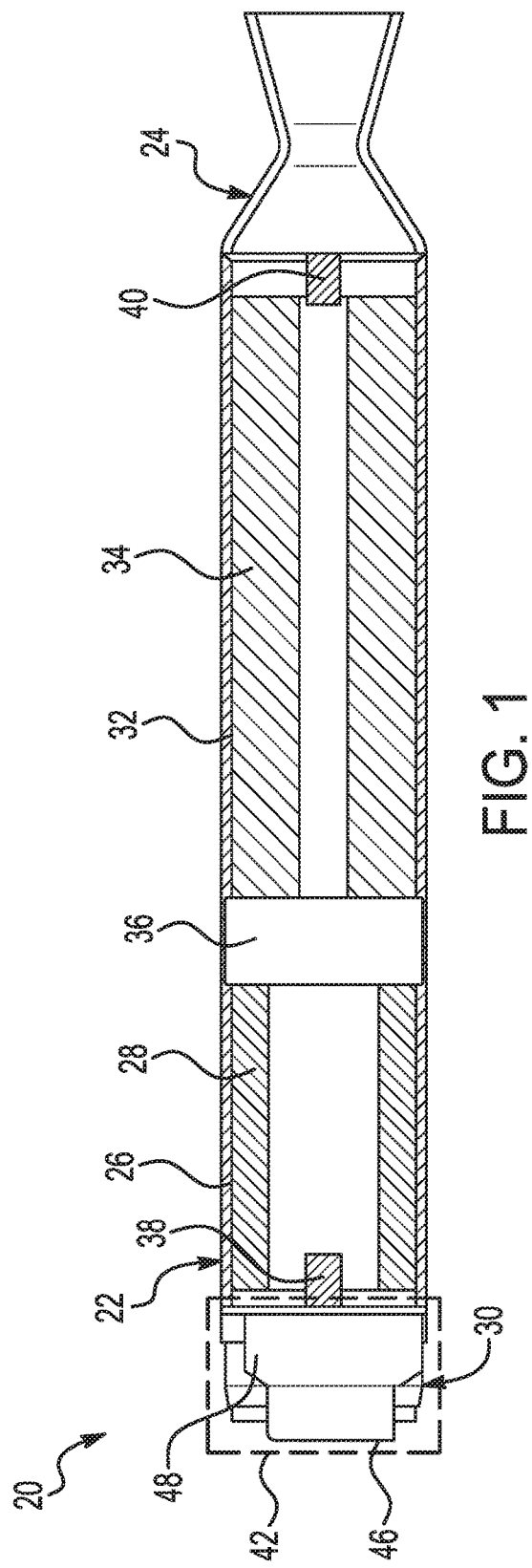
FIG. 1 shows a flight vehicle having a known flight test system including flight termination energetics that are accommodated in a payload module of the flight vehicle.
Figure 2:
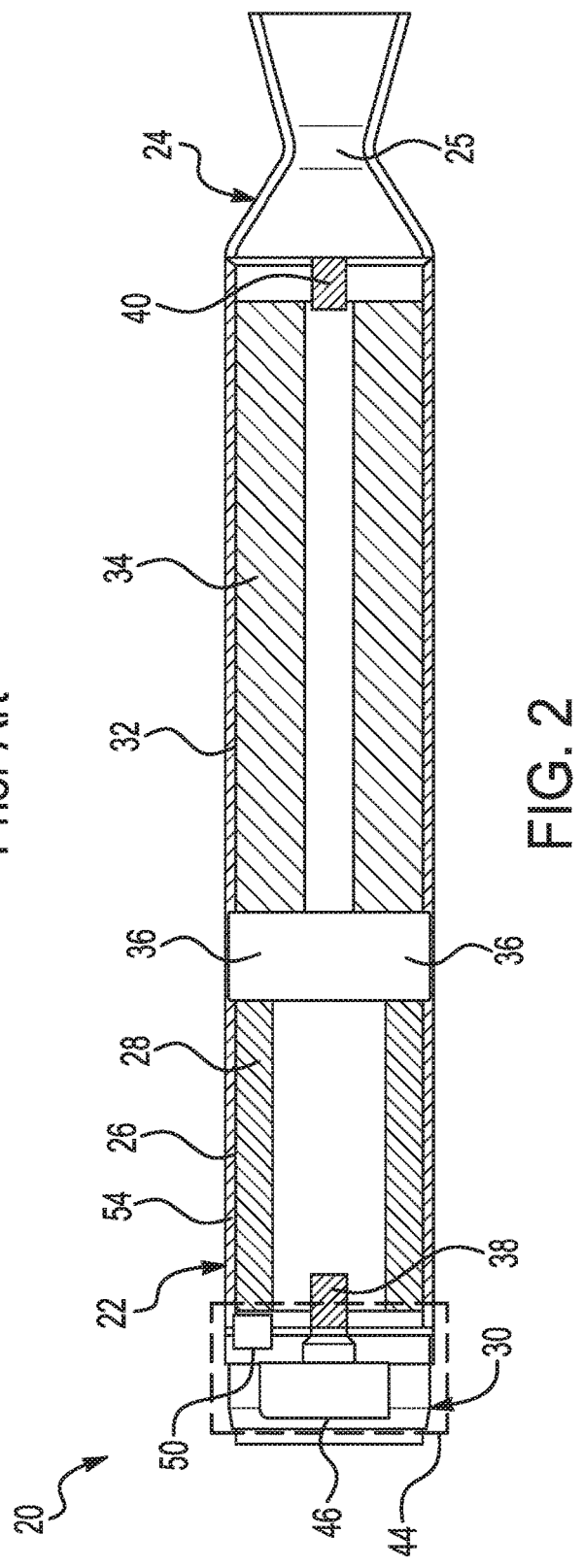
FIG. 2 shows a flight vehicle having a flight test system according to an embodiment of the present application in which the flight test system includes a thrust termination charge coupled to a propellant in a rocket motor.

Referring first to FIGS. 1 and 2, a flight vehicle 20 including a rocket motor module 22 is shown. The rocket motor module 22 includes a nozzle assembly 24 having a throat 25 and at least one pressure vessel 26 containing a burnable propellant 28. The flight vehicle 20 may include a payload module 30 for carrying a payload during normal operation of the flight vehicle 20, such as during execution of a military mission. The flight vehicle 20 may be configured for carrying any suitable payload and the payload module 30 may include a plurality of payloads. Exemplary payloads include satellites, space probes, cargo, or warheads. In an exemplary embodiment, the flight vehicle 20 may be a rocket that is configured to carry a warhead during normal, non-testing operation of the flight vehicle 20.

The rocket motor module 22 may include a single pressure vessel 26 containing a single propellant 28 such that the rocket motor module 22 includes a single-pulse rocket motor with a single casing. In other exemplary embodiments, the rocket motor module 22 may be a multi-pulse or dual pulse rocket motor that burns in at least two segments such that the rocket motor has a first pulse state and an additional pulse state that is initiated after the first pulse state. In an exemplary embodiment of the multi-pulse rocket motor, an inter-pulse delay may occur between the pulse states. In the multi-pulse rocket motor, the pressure vessel 26 may be a second pulse chamber and a first pulse chamber 32 is configured for pressurization prior to pressurization of the second pulse chamber 26. The different pulse chambers 26, 32 may be defined within separate casings of the rocket motor module 22.

The first pulse chamber 32 contains a first burnable propellant 34 that is separate from the propellant 28 of the second pulse chamber 26. The first burn propellant 34 may have different characteristics as compared with the burnable propellant 28 contained in the second pulse chamber 26. For example, the propellants 28, 34 may be configured to provide different burning rates relative to each other. The pulse chambers 26, 32 may be formed to have different sizes such that different amounts of the propellants 28, 34 may be provided. The sizes and burn rates of the propellants 28, 34 and pulse chambers 26, 32 are dependent on the desired operation for a particular application of the flight vehicle 20.

The propellants 28, 34 are solid propellant grain that are configured to burn and produce exhaust gas in the corresponding pulse chamber 26, 32. The exhaust gas is directed through the nozzle assembly 24 to produce thrust for the flight vehicle 20. The shape and size of the propellant grains is predetermined to achieve a specific burn time, amount of exhaust gas, and a thrust rate. The pulse chambers 26, 32 and thus the propellants 28, 34 are separated by a rigid separation device 36 of the flight vehicle 20 such that during the first pulse state of the flight vehicle 20, the first propellant 34 burns separately relative to the second propellant 28 which burns during the second pulse state of the flight vehicle 20. Each pulse chamber 26, 32 also includes an ignitor 38, 40, respectively, for igniting the propellants 28, 34 during the normal, non-testing operation of the flight vehicle 20.

Figure 3:
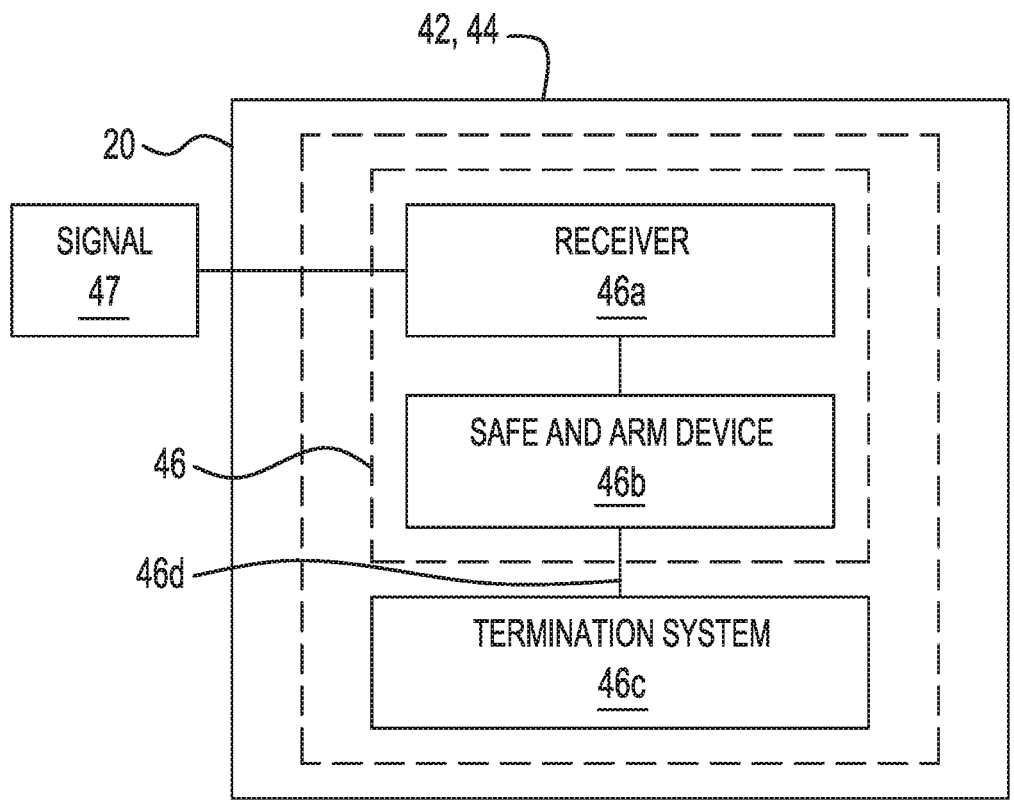
FIG. 3 shows a schematic drawing of flight termination system electronics for the flight test system.

Referring in addition to FIG. 3, instead of normal operation, the flight vehicle 20 may be selected to undergo flight testing to test the capabilities of the flight vehicle 20 for normal operation. For example, flight testing may occur on a military test range. During flight testing, the flight vehicle 20 may be implemented with a flight test system 42, 44. The flight test system 42, 44 is modular in that the system is separately integrated into the envelope defined by the body of the existing flight vehicle 20. The flight test system 42, 44 may be assembled or integrated into different modules of the flight vehicle 20, such as the rocket motor module 22 or the payload module 30.

Range safety requirements for testing are determined based on the configuration of the flight vehicle 20 and conditions of the range. The flight vehicle 20 undergoing testing is configured to meet the safety requirements by terminating thrust on demand and the flight test system 42, 44 includes flight termination system electronics 46 that are configured to interface with a Range Safety System. Any suitable hardware and software components may be used in the flight termination system electronics 46. The flight termination system electronics 46 may include any combination of control units, batteries, pyrotechnics, telemetry components, sensors, antennas, electrical connectors, receivers, decoders, transponders, or any other suitable components.

In an exemplary embodiment, the flight termination system electronics 46 include at least a receiver 46a, a safe and arm device 46b, and a termination system 46c. The safe and arm device 46b may include any suitable electronics, electro-mechanical, or laser devices. When the safe and arm device 46b is in the safe position, the safe and arm device 46b is prevented from initiating the termination system 46c. The safe and arm device 46b may be isolated from any electrical inputs and outputs in communication with the termination system 46c when in the safe position. When the receiver 46a receives a signal 47 from range safety personal, the safe and arm device 46b is activated to move into the arm position in which the termination system 46c is initiated to start the thrust termination sequence.

As shown in FIG. 1, a prior attempt to incorporate the flight test system 42 into the existing flight vehicle 20 includes replacing the payload module 30, or sections of the payload module 30 with the flight test system 42 in which the termination system 46c is an energetic charge 48 which may include an explosive train. An arming circuit 46d of the safe and arm device 46b is energized by an input voltage pulse to initiate the energetic charge 48 of the termination system 46c which causes the flight vehicle 20 to rupture.

Using the known energetic charge 48 as the termination system 46c is disadvantageous in that the prior flight test system 42 may not be accommodated in some flight vehicles due to the envelope constraints. The energetic charge 48 may include a linear shaped charge that requires additional manifolds and brackets for accommodation such that length may be added to the flight vehicle 20 to accommodate the flight test system 42. The added length and/or weight required to accommodate energetic charges 48 is undesirable and may impact the flight test of the flight vehicle 20.

FIG. 2 shows the flight test system 44 according to the present application in which the flight test system 44 includes an electroexplosive detonator 50 coupled to the propellant 28 inside the pressurized second chamber 26. The detonator 50 is configured to receive electrical energy and initiate a mechanical shock wave and/or an exothermic reaction, such as combustion or deflagration. Consequently, the propellant 28 being coupled to the adjacent detonator 50 enables the detonator 50 to initiate combustion and rupture of the propellant 28. The detonator 50 thus constitutes the termination system 46c that is initiated by the flight termination system electronics 46, as shown in FIG. 3.

Figure 4:
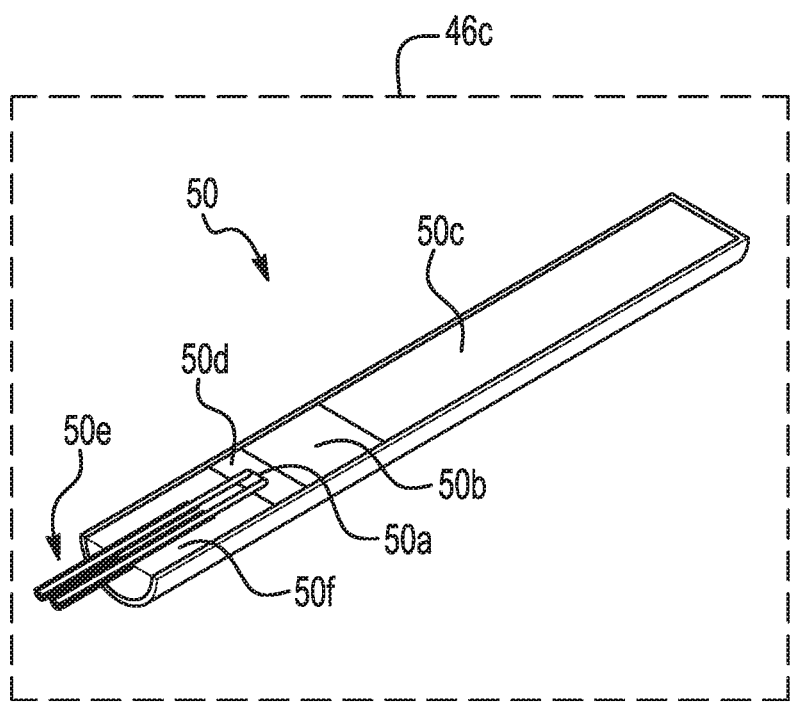
FIG. 4 shows an electroexplosive device as an exemplary embodiment of the thrust termination charge of FIG. 2.

Referring in addition to FIG. 4, the detonator 50 may be in the form of an electro-explosive device or the detonator 50 may have any other suitable structure. Exemplary features of the detonator 50 include a thin resistive wire or bridgewire, a primary charge that surrounds the bridgewire, a secondary charge ignited by the primary charge explosion, a main charge, and protective elements, such as a sleeve, plug, or case. FIG. 4 shows an exemplary embodiment of the detonator 50 in which the detonator 50 is an electro-explosive device including a bridgewire 50a, a primary explosive 50b, a base charge 50c, an ignition charge 50d, lead wires 50e, and an insulating body 50f. The illustrated electro-explosive device is merely exemplary and many other configurations of the detonator 50 are suitable.

In operation, when the signal 47 is received by the receiver 46a of the flight termination electronics 46, the safe and arm device 46b is moved into the arm position. When in the arm position, a DC or very low frequency current is supplied through the lead wires 50e of the detonator 50 which are connected to the arming circuit 46d. The current reaches the bridgewire 50a of the detonator 50 for initiation of the detonator 50. The current passing through the bridgewire 50a causes heating of the bridgewire 50a and ignition of the charges 50c, 50d which results in explosion of the primary explosive 50b. The explosion of the detonator 50 then ignites the propellant 28 coupled thereto. Using the detonator 50 instead of the larger energetic charge 48 of the prior flight test system 42 is advantageous in that the detonator accommodates a smaller volume and may be easily integrated into the existing envelope of the rocket motor module 22.

In an exemplary embodiment in which the rocket motor module 22 includes the multi-pulse rocket motor having the first pulse state in which the first pulse chamber 32 is pressurized and the additional pulse state in which the second pulse chamber 26 is pressurized, the detonator 50 is arranged to ignite the propellant 28 of the second pulse chamber 26. Accordingly, the arming circuit 46d of the safe and arm device 46b is energized by the input voltage pulse occurring during the additional pulse state such that the detonator 50 is initiated by the additional pulse. Using the detonator 50 is thus advantageous in that one of the pulses of the multi-pulse rocket motor pulse is effectively used as the thrust termination charge for the flight vehicle 20.

Figure 5:
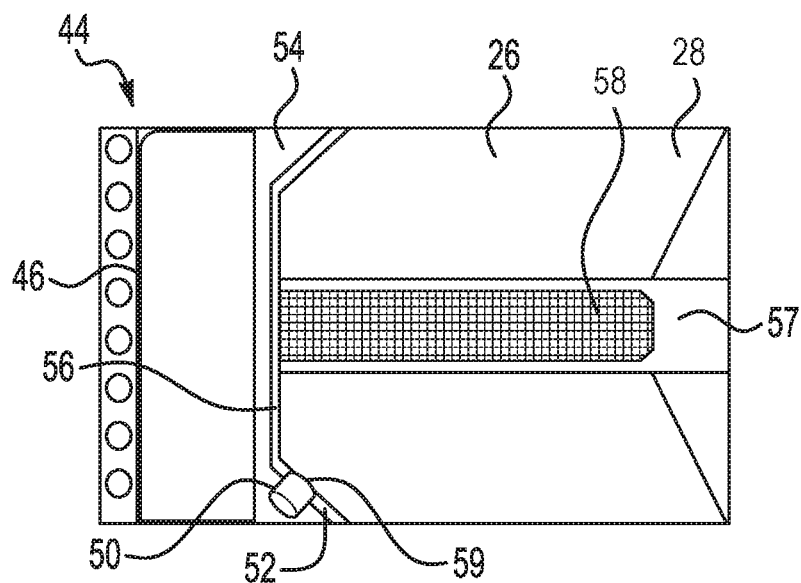
FIG. 5 shows a detailed view of the flight test system of FIG. 2 prior to activation of the thrust termination charge.
Figure 6:
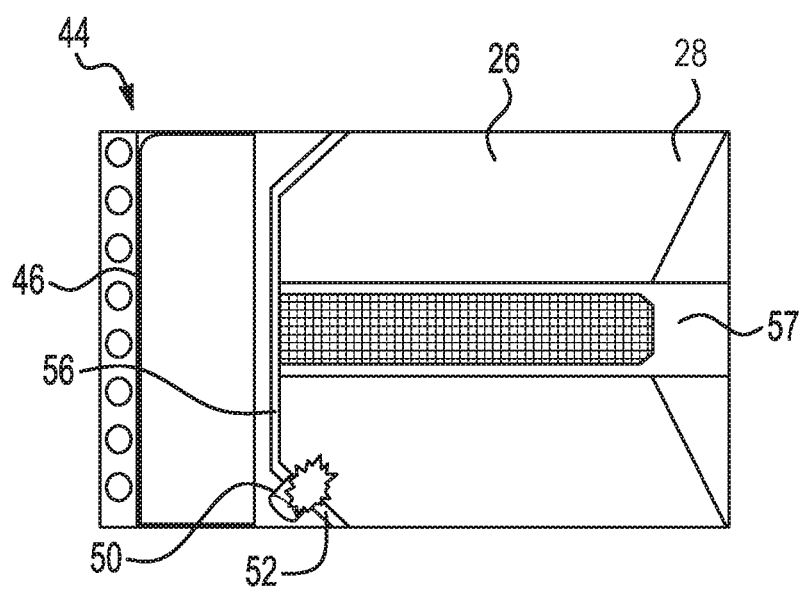
FIG. 6 shows a detailed view of the flight test system of FIG. 2 during activation of the thrust termination charge and igniting of the propellant.
Figure 7:
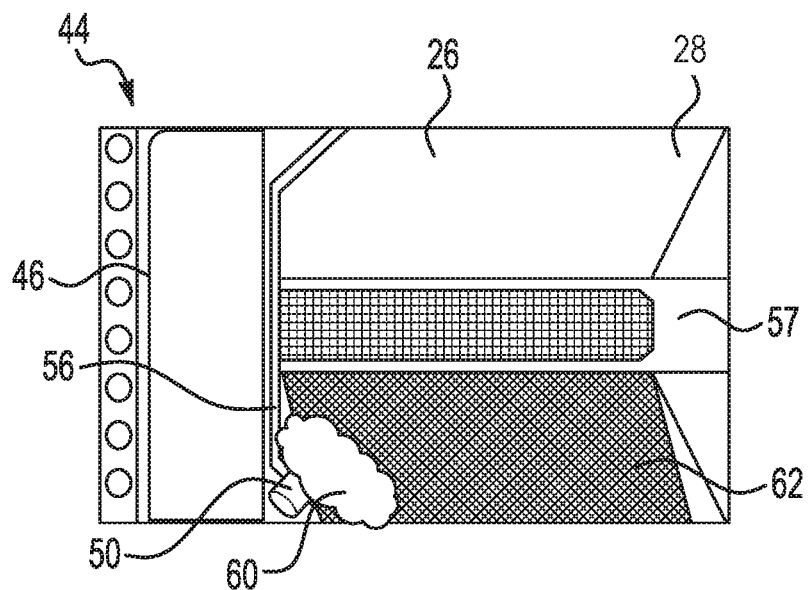
FIG. 7 shows a detailed view of the flight test system of FIG. 2 after activation of the thrust termination charge and rupturing of the propellant.

Referring in addition to FIGS. 5-7, further details of the flight test system 44 including the flight termination system electronics 46 and the detonator 50 are shown. FIG. 5 shows the detonator 50 coupled to and in direct contact with a burn surface 52 of the propellant 28. The detonator 50 is arranged within a casing 54 that defines the pressure vessel 26 containing the propellant 28. In a multi-pulse rocket motor configuration, the casing 54 may be a separate casing relative to the casing for the first pulse chamber 32, as shown in FIG. 2. In exemplary embodiments, the flight termination system electronics 46 may also be integrated into the casing 54.

The casing 54 may be formed of any suitable rigid material, such as metal. A forward-facing dome 56 is defined by the casing 54 and forms a forward end of the rocket motor module 22 with reference to the direction of travel of the flight vehicle 20. The casing 54 surrounds the propellant 28. Any suitable liners and/or thermal protection layers may be provided between the casing 54 and the propellant 28. A center bore 57 may extend longitudinally through the casing 54 and through the regions containing the propellant 28 for combustion gas to flow to the nozzle assembly 24 (shown in FIG. 2). The center bore 57 may also define an igniter-receiving pocket 58 configured to receive an igniter 38 (shown in FIG. 2) if the flight vehicle 20 had not been selected for testing and was to be used for normal operation.

The detonator 50 is mounted to the forward-facing dome 56 and configured to extend through the forward-facing dome 56 for contact with the burn surface 52 of the propellant 28. The forward-facing dome 56 defines a port 59 that is configured to receive the detonator 50. The port 59 may be plugged by a separate plug prior to testing and the plug may be removed to insert the detonator 50 for testing. The port 59 may be a port configured to accommodate sensors or other testing equipment such that, advantageously, the port 59 may be formed in an existing flight vehicle 20 to enable easy integration of the detonator 50 into the existing casing 54.

The burn surface 52 of the propellant 28 may be a final burn surface for the rocket motor module 22 including the multi-pulse rocket motor in that the other propellant 34 (shown in FIG. 2) is already burned. The final burn surface may be a forward-facing surface of the propellant 28. The detonator 50 may be arranged on any suitable burn surface of the propellant 28 and the location may be dependent on the configuration of the flight vehicle 20 and the configuration of the propellant 28 within the pressure vessel 26. For example, the burn rate and the amount of propellant 28 may determine where the detonator 50 is to be located. The detonator 50 may have any suitable size and the detonator 50 may be sized for accommodation in a particular casing 54 including a propellant 28 as required for a particular application. In an exemplary embodiment, the detonator 50 may have a size that is similar to the size of a pressure transducer. In any event, the detonator 50 is sized to be smaller than an energetic train and does not require any additional mounting components such as brackets or supports.

FIG. 6 shows activation of the detonator 50 by the flight termination system electronics 46 and FIG. 7 shows the rupturing of the propellant 28. The detonator 50 is configured to ignite the propellant 28 without a vent path in the pressure vessel 26 meaning that the combustion gas 60 from the burning propellant 28 is not vented and builds up in the pressure vessel 26. The pressure in the pressure vessel 26 increases and ultimately exceeds the mechanical strength capability of the propellant 28 which causes structural failure in the propellant 28. Due to the rupturing of the propellant, a large surface area 62 is formed within the pressure vessel 26, as shown in FIG. 7. The increase in the surface area 62 causes a pressure rise in the pressure vessel 26 such that a critical pressure for the casing 54 is quickly reached. The overpressurization exceeds the structural capability of the casing 54 which causes the casing 54 to fail and rupture thereby terminating thrust of the rocket motor module 22.

Figure 8:
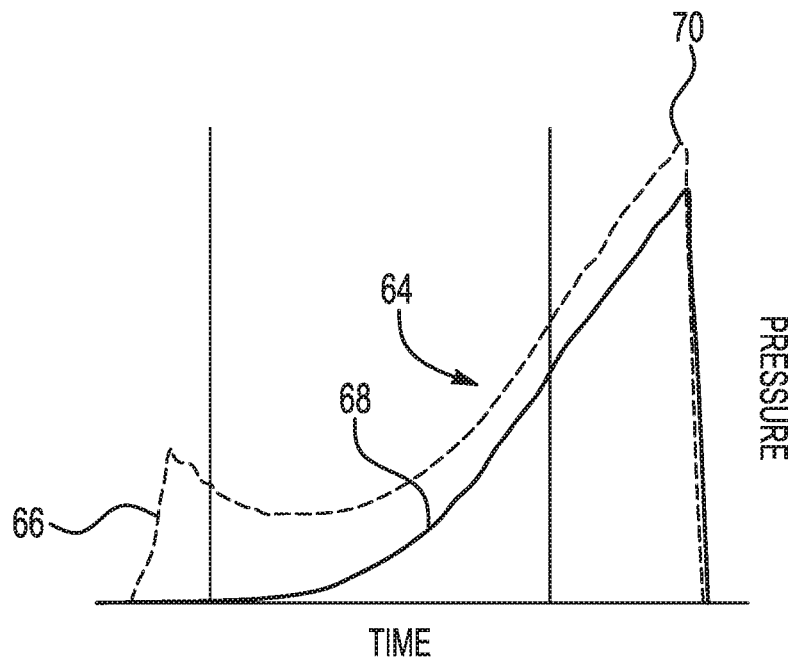
FIG. 8 shows a graph illustrating the pressure in a case of the rocket motor of FIG. 2 during a first pulse state and an additional pulse state.

Referring in addition to FIG. 8, the pressurization of the pressure vessel 26 and the corresponding thrust neutralization charge may occur during a pulse of a multi-pulse rocket motor such that the pressure vessel 26 is the second pulse chamber 26 (shown in FIG. 2). FIG. 8 shows pressure 64 in the rocket motor module 22 as a function of time, starting with the first pulse state. The first pulse state corresponds to a first pressure 66. An additional pulse is initiated during the second pulse state at a time after the first pulse is initiated. The second pulse state corresponds to a second pressure 68 and results in an increase in the pressure. The total pressure increases until the pressure reaches a critical pressure 70 at which the pressure exceeds the structural capability of the casing and the casing ruptures.

The rocket motor may be a single-pulse or a multi-pulse rocket motor. If the multi-pulse rocket motor includes two pulses, the detonator 50 may be configured for initiation during the additional pulse state. The arrangement of the detonator 50 is dependent on the flight vehicle 20 and the desired termination of the flight vehicle 20. As shown in FIGS. 5-7, the ruptured casing may be the casing 54 that contains the pressure vessel 26. The pressurization of a casing may be determined by equation (1).

$$P_c = \left[\frac{A_b C * \rho_p a}{A_t g}\right]^{\frac{1}{1-n}} \qquad (1)$$

With regards to equation (1), the value $P_c$ represents the chamber pressure in the pressure vessel 26, as shown in FIGS. 2 and 5-7, the value $A_b$ represents the area of the burn surface of the propellant, the value $p_p$ represents the propellant density, and the value C* corresponds to the characteristic exhaust velocity. As further shown in FIG. 2, the value $A_t$ represents the area of the throat 25 of the nozzle assembly 24 for the flight vehicle 20. The value g corresponds to the gravitational acceleration and the value a corresponds to the burn rate coefficient of the propellant. Igniting the additional pulse forms an additional burn area such that the chamber pressure increases, as shown in Equation (2).

$$r_b = a P_c^n \qquad (2)$$

With regards to equation (2), the value $r_b$ represents the propellant burn rate and the value n represents the pressure exponent. The resulting increase in pressure raises the propellant burn rate $r_b$ to form a rapidly increasing overpressurization feedback loop. Using equations (1) and (2), the detonator 50 for a particular application may be selected from a plurality of detonators based on at least one of a size of the pulse chamber, the size of the propellant, the burn rate of the propellant, the density of the propellant, or any other application-specific characteristics of the rocket motor.

Figure 9:
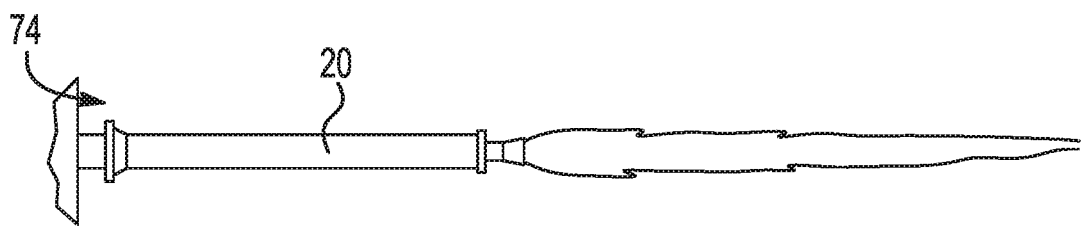
FIG. 9 shows the flight vehicle of FIG. 2 during testing in which the rocket motor is in a first pulse state.
Figure 10:
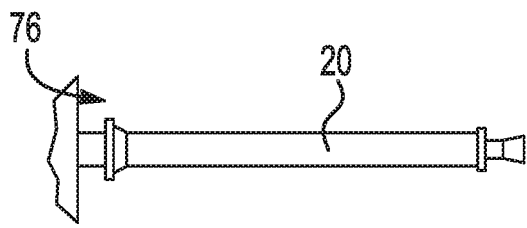
FIG. 10 shows the flight vehicle of FIG. 2 during testing in which the rocket motor is in an interpulse delay state between the first pulse state and the additional pulse state.
Figure 11:
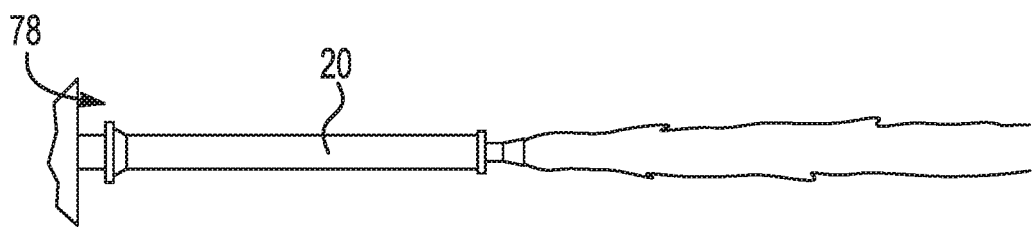
FIG. 11 shows the flight vehicle of FIG. 2 during testing in which the rocket motor is in the additional pulse state.
Figure 12:
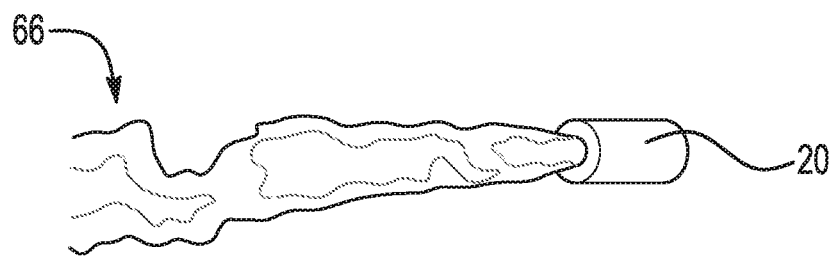
FIG. 12 shows the flight vehicle of FIG. 2 during testing in which the rocket motor is pressurized during the first pulse state.
Figure 13:
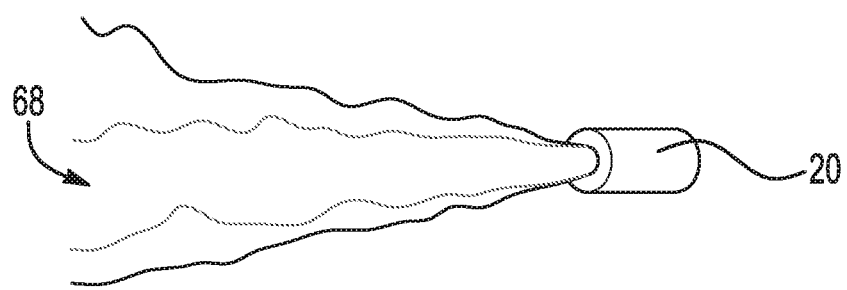
FIG. 13 shows the flight vehicle of FIG. 2 during testing in which the rocket motor is pressurized by the additional pulse state during the first pulse burn.
Figure 14:
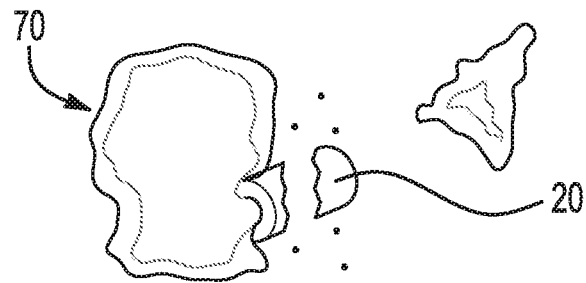
FIG. 14 shows the flight vehicle of FIG. 2 during testing in which the rocket motor is overpressurized and thrust of the rocket motor is terminated.

Referring now to FIGS. 9-14, testing of the flight vehicle 20 is shown. FIGS. 9-11 show normal dual pulse operation of the multi-pulse rocket motor in the flight vehicle 20. FIG. 9 shows the flight vehicle 20 during a first pulse state 74 which corresponds to the pressure 66, as shown in FIG. 8. FIG. 10 shows the flight vehicle 20 during an interpulse delay state 76 that is between the first pulse state 74 and an additional pulse state. FIG. 11 shows the flight vehicle 20 during the additional pulse state 78 that is initiated at a time after the first pulse. The additional pulse state 78 corresponds to the pressure 68, as shown in FIG. 8. FIG. 12 shows the flight vehicle 20 having the pressure 66 during the first pulse state 74 and FIG. 13 shows the flight vehicle 20 having increased pressure 68 during the additional pulse state 78. FIG. 14 shows the flight vehicle 20 when the pressure has reached the critical pressure 70 and the flight vehicle 20 is overpressurized such that the casing is ruptured and thrust is terminated.

Figure 15:
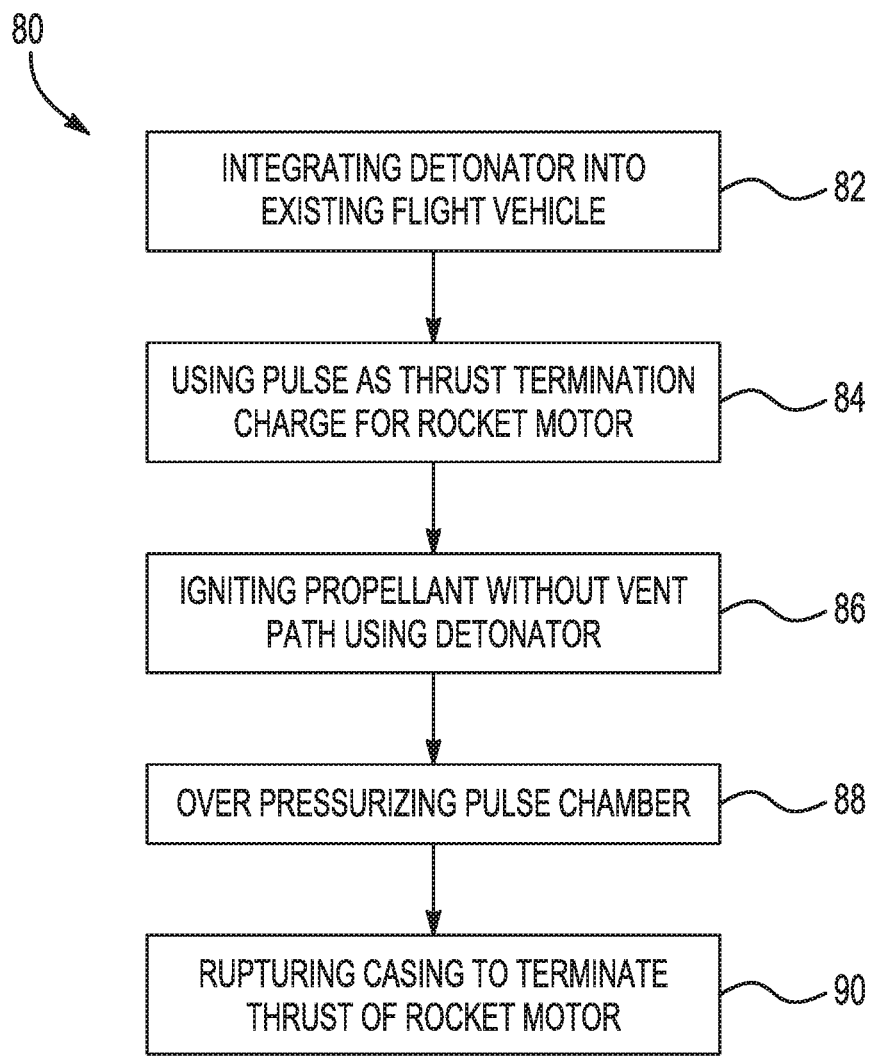
FIG. 15 shows a flow chart for a method of flight testing a multi-pulse rocket motor, such as the rocket motor shown in FIGS. 2-7.

Referring now to FIG. 15, a method 80 of flight testing a multi-pulse rocket motor, such as in the rocket motor module 22 of FIG. 2, is shown. The method 80 may include using the flight test system 44 shown in FIGS. 2-7. Step 82 of the method 80 includes integrating the electroexplosive detonator 50 into the pulse vessel 26 of an existing multi-pulse rocket motor module 22 (shown in FIGS. 2-7). Step 82 may include plugging a port 59 formed in the pulse chamber prior to flight testing, unplugging the port 59, and inserting the detonator 50 into the port 59 for testing (shown in FIG. 3). Inserting the detonator 50 may include arranging the detonator 50 on a forward face or a final burn surface of the burnable propellant 28 (shown in FIGS. 2-7).

Step 82 also includes arranging the flight test system 44 in the flight vehicle 20 (shown in FIG. 2). Flight termination system electronics 46 that are in communication with the detonator 50 may be inserted into the existing casing 54 of the flight vehicle 20 (shown in FIGS. 2-7). For example, the flight termination system electronics 46 may be accommodated in a payload module 30 that is configured to accommodate a payload during normal operation of the flight vehicle 20 (shown in FIG. 2). Accordingly, the flight test system 44 may be integrated into the existing envelope of the flight vehicle 20 without adding any additional components or accommodation space to the flight vehicle 20.

Step 84 of the method 80 includes using one pulse of multiple pulses as a thrust termination charge for the rocket motor module 22. As shown in FIGS. 11 and 13, the additional pulse state 78 may be used as the thrust termination charge that initiates the detonator 50. Step 86 of the method 80 includes igniting the propellant 28 without a vent path using the detonator 50. The detonator 50 is activated by the safe and arm device 46b during the additional pulse state 78 (shown in FIG. 3). Step 88 of the method 80 includes overpressurizing the pulse vessel 26 corresponding to the additional pulse state 78. Step 88 includes rupturing the propellant 28 to increase the surface area and thus the pressure in the pulse vessel 26. Step 90 includes rupturing the casing 54 to terminate the thrust of the rocket motor module 22. The increased surface area exceeds the structural capability of the casing 54 such that the casing 54 fails and the rocket thrust is terminated.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flight test system for a rocket motor, the flight test system comprising:
   flight termination system electronics arranged in a casing of the rocket motor; and
   an electroexplosive detonator coupled to and in direct contact with a propellant inside a pressure vessel defined by the casing, the electroexplosive detonator being arranged inside the casing and configured for activation by the flight termination system electronics to ignite the propellant without a vent path such that the pressure vessel is overpressurized to rupture the casing.

2. The flight test system according to claim 1, wherein the electroexplosive detonator is arranged on a final burn surface of the propellant.

3. The flight test system according to claim 1, wherein the electroexplosive detonator is arranged on a forward-facing surface of the propellant.

4. The flight test system according to claim 1, wherein the casing has a forward-facing dome portion and the electroexplosive detonator is mounted to the dome portion.

5. The flight test system according to claim 4, wherein the dome portion defines a pluggable port for receiving the electroexplosive detonator.

6. The flight test system according to claim 1, wherein the electroexplosive detonator is configured to ignite the propellant without a vent path.

7. The flight test system according to claim 1, wherein the propellant comprises a solid propellant grain.

8. A flight test system comprising:
a multi-pulse rocket motor module including a first pulse chamber containing a first burnable propellant that is burned during a first stage of the multi-pulse rocket motor and a second pulse chamber containing a second burnable propellant that is burned during a second stage of the multi-pulse rocket;
flight termination system electronics arranged in the multi-pulse rocket motor module; and
an electroexplosive detonator coupled to and in direct contact with the second burnable propellant inside the second pulse chamber, the electroexplosive detonator being activated by the flight termination system electronics to ignite the second burnable propellant without a vent path such that the second pulse chamber is overpressurized to rupture.

9. The flight test system according to claim 8, wherein the electroexplosive detonator is arranged on a final burn surface of the second burnable propellant.

10. The flight test system according to claim 8, wherein the electroexplosive detonator is arranged on a forward surface of the second burnable propellant.

11. The flight test system according to claim 8, wherein the second pulse chamber has a forward-facing dome portion, wherein the electroexplosive detonator is mounted to the dome portion.

12. The flight test system according to claim 11, wherein the second pulse chamber defines a pluggable port for receiving the electroexplosive detonator.

13. The flight test system according to claim 8, wherein the electroexplosive detonator is configured to ignite the second burnable propellant without a vent path.

14. The flight test system according to claim 8, wherein the first burnable propellant and the second burnable propellant comprise a solid propellant grain.

15. A method of flight testing a mufti-pulse rocket motor, the method comprising:
using an additional pulse that occurs after a first pulse in the rocket motor as a thrust termination charge;
overpressurizing a pulse chamber containing a burnable propellant without a vent path during the additional pulse;
rupturing the burnable propellant to fail a casing of the rocket motor and terminate thrust of the rocket motor;
inserting an electroexplosive detonator into the pulse chamber and directly contacting the electroexplosive detonator against the burnable propellant; and
activating the electroexplosive detonator as the thrust termination charge.

16. The method according to claim 15 further comprising:
selecting the electroexplosive detonator from a plurality of detonators based on at least one of a size of the pulse chamber, size of the burnable propellant, burn rate of the burnable propellant, and density of the burnable propellant.

17. The method according to claim 16 further comprising:
coupling the electroexplosive detonator to a final burn surface of the burnable propellant; and
igniting the burnable propellant without a vent path using the electroexplosive detonator.

18. The method according to claim 17 further comprising:
inserting flight termination system electronics in a casing of the rocket motor; and
activating the electroexplosive detonator using the flight termination system electronics.

19. The method according to claim 16 further comprising integrating the electroexplosive detonator into the pulse chamber of a predefined casing of the rocket motor.

20. The method according to claim 19 further comprising:
plugging a port formed in the casing of the pulse chamber prior to flight testing;
unplugging the port; and
inserting the electroexplosive detonator into the port for flight testing.

* * * * *